(12) United States Patent
Miller (10) Patent No.: US 9,807,936 B2
(45) Date of Patent: Nov. 7, 2017

(54) SWATH ROLLER WITH CONTROLLED ANCHORING FORCE

(71) Applicant: Bourgault Industries Ltd., St. Brieux (CA)

(72) Inventor: Gerry Lee Miller, St. Brieux (CA)

(73) Assignee: Bourgault Industries Ltd., St. Brieux, Saskatchewan (CA)

( * ) Notice: Subject to any disclaimer, the term of this patent is extended or adjusted under 35 U.S.C. 154(b) by 149 days.

(21) Appl. No.: 15/059,676

(22) Filed: Mar. 3, 2016

(65) Prior Publication Data
US 2016/0183471 A1    Jun. 30, 2016

Related U.S. Application Data

(62) Division of application No. 14/295,829, filed on Jun. 4, 2014, now abandoned.

(30) Foreign Application Priority Data

Jun. 18, 2013  (CA) ..................... 2818449

(51) Int. Cl.
*A01D 91/04*     (2006.01)
*A01D 57/30*     (2006.01)
*A01D 43/04*     (2006.01)

(52) U.S. Cl.
CPC ............. *A01D 91/04* (2013.01); *A01D 43/04* (2013.01); *A01D 57/30* (2013.01)

(58) Field of Classification Search
CPC ...... A01D 91/04; A01D 41/133; A01D 43/04; A01D 57/30; A01D 89/008; A01D 34/001; A01D 34/8355; A01B 29/00–29/06

See application file for complete search history.

(56) References Cited

U.S. PATENT DOCUMENTS

| 2,830,511 A | * | 4/1958 | Wills ................... E01C 19/238 |
| | | | 404/128 |
| 3,339,642 A | | 9/1967 | Scarborough |
| 3,339,643 A | * | 9/1967 | Scarborough .......... A01B 29/00 |
| | | | 172/184 |
| 3,731,468 A | * | 5/1973 | Blumhardt ............. A01D 57/30 |
| | | | 56/16.4 B |

(Continued)

FOREIGN PATENT DOCUMENTS

| CA | 2311694 | 12/2001 |
| CA | 2635859 | 12/2009 |
| CA | 2818449 | 12/2014 |

*Primary Examiner* — Robert E Pezzuto
*Assistant Examiner* — Adam J Behrens
(74) *Attorney, Agent, or Firm* — Frost Brown Todd LLC (57) ABSTRACT

A swath roller apparatus is adapted to be attached to a swather, where the swather is operative to cut standing crop plants and lay cut plants in a swath as the swather moves along the ground in an operating travel direction. A drum is rotatably attached to an axle that is adapted to be movably attached to a rear portion of the swather such that the axle is oriented substantially horizontally and perpendicular to the operating travel direction, and such that the drum moves up and down and rolls along a top of the swath exerting a downward anchoring force on the swath. A bias element is operative to exert a bias force on the axle, and a bias force control is operative to vary the bias force to vary the anchoring force.

5 Claims, 5 Drawing Sheets

(56) References Cited

U.S. PATENT DOCUMENTS

| | | | | |
|---|---|---|---|---|
| 3,756,203 | A * | 9/1973 | Dedoes | A01B 29/045 172/21 |
| 4,269,535 | A * | 5/1981 | Schultz | E02D 3/026 172/177 |
| 4,702,062 | A * | 10/1987 | Phelan | A01D 57/30 56/119 |
| 4,858,419 | A * | 8/1989 | Bernier | A01D 57/28 56/189 |
| 4,878,544 | A * | 11/1989 | Barnhart | E01C 19/281 172/125 |
| 6,171,020 | B1 * | 1/2001 | Pikna | A01B 13/16 404/121 |
| 6,708,777 | B1 * | 3/2004 | Holmes | A01B 29/045 172/547 |
| 8,430,179 | B2 * | 4/2013 | Van Buskirk | A01B 29/048 111/139 |
| 8,820,428 | B2 * | 9/2014 | McCrea | A01B 29/02 111/130 |
| 8,979,438 | B2 * | 3/2015 | Maas | E02D 3/026 172/21 |
| 2010/0300056 | A1 * | 12/2010 | Sprinkmann | A01D 34/44 56/17.4 |
| 2012/0285318 | A1 * | 11/2012 | Jessen | A01B 63/1006 91/403 |
| 2014/0366502 | A1 | 12/2014 | Miller | |

* cited by examiner

SWATH ROLLER WITH CONTROLLED ANCHORING FORCE

This application is a division of and claims priority to U.S. patent application Ser. No. 14/295,829, filed Jun. 4, 2014 entitled "Swath Roller with Controlled Anchoring Force," which claims the benefit of Canadian Application No. 2818449, filed Jun. 18, 2013, both of which are incorporated herein by reference in their entirety for all purposes.

This disclosure is in the field of agricultural implements and in particular swath rollers for pushing crop swaths down into standing stubble.

BACKGROUND

In some agricultural areas it is popular to cut and windrow, or swath, crops before harvesting in order to promote earlier and more uniform maturing and to achieve the necessary drying of the crop. An implement known as a swather comprises generally a cutting header and belts to lay cut crop in a swath. The header is typically raised and lowered by lift hydraulic cylinders to follow ground contours and variations in crop height. Such swathers can be self-propelled, or towed behind a tractor.

There is risk of loss or damage to a crop while it is in the swath. In the case of light and fragile crops such as canola, peas, flax or beans this risk includes loss of crop that is shelled out onto the ground due to wind action on the swath and the possibility of the wind actually dislocating and scattering the swath, making efficient harvesting impossible.

As these crops dry in the swath they become lighter, more brittle and increasingly susceptible to movement & damage by the wind. To minimize losses and damage to the crop in the swath it has become common practice to use a swath roller to compact the swath and push it down into the supporting standing stubble and anchor the swath to resist movement by wind.

Swath rollers are typically mounted onto a swather, or mounted in a frame on wheels that is towed along behind the swather. Swath rollers generally comprise a drum of substantially cylindrical shape that is mounted either in a wheeled frame that straddles the swath, or in a frame attached to a swather such that the drum is positioned over the swath and rolls along the top of the swath that has just exited the swather and pushes the swath down into the standing stubble of the cut crop.

Simple cylindrical swath rollers do nothing to compact or anchor the edges of the swath and so drums have been developed with ends which are shaped generally as the frustum of a cone so that the roller contacts both the top and edges of the swath, and pushes the edges of the swath down farther into the standing stubble than the middle. The swath is then more resistant to movement by wind. Bumps and the like can also be provided on the ends of the drum in an attempt to knit the swath into the standing stubble. These various drum end sections can be generally referred to as edge compacting ends.

Canadian Patent Number 2,311,694 to Cresswell illustrates a typical swath roller of both the tow behind trailer and swather mounted types. In swath rollers where the drum is mounted on a trailer pulled behind the swather, the vertical position of the drum with respect to the frame is typically adjustable, but once adjusted the vertical position is fixed during operation, and the machine must be stopped for the operator to attend to further adjustments. The trailers used typically comprise a light frame with a wheel on each side, and the drum mounted between the wheels such that the rotational axes of the wheels and drum are substantially aligned. The height of the drum above the ground then stays substantially the same as the swather moves along sloping terrain.

On typical swather mounted models, the drum is mounted in a frame that is pivotally attached to the rear of the swather about a horizontal axis oriented perpendicular to the travel direction. A winch is typically mounted on the swather and a cable to the frame holds the frame and drum off the ground at the desired vertical location, low enough to push the swath into the stubble, but above the ground. The drum and frame can float up from this minimum vertical location, but the winch cable prevents it from moving down past the limit of the cable.

As the swather moves through a field, the volume of crop material being cut can vary significantly, such that the size of swath exiting the rear of the swather varies significantly as well, and in heavy crop areas the height of the standing stubble left is often significantly higher as well Where the swath gets very large and the stubble gets high, the drum floats upward. On trailer mounted drums, the wheels of the light trailer can be lifted off the ground, while on swather mounted drums the drum simply floats up and down as the swath varies.

In a typical operation the height of the drum is set at a height above the ground that is suitable for the average crop volume. In heavier crop areas the drum then floats upward, while in lighter crop areas, where the stubble is typically shorter, the drum may have little contact with the swath.

Canadian Patent Number 2,635,859 to Miller discloses a swath roller system where the drum is moved up and down by an actuator that can be activated by the swather operator to move the drum up and down with respect to the ground while the vehicle is moving along the ground. While the drum does move up and down with respect to the ground, this is accomplished by moving the drum up and down with respect to the vehicle, either a swather or trailer, to which same is mounted, and the drum is at a fixed location with respect to the swather or trailer. Unless the drum is mounted on the same rotational axis as wheels of the vehicle, the relative position of the drum and the ground can change significantly when traversing steep slope changes, such that the drum can sometimes be above and not touching the swath, or can be squashing the swath into the ground. To avoid such problems in varying terrain, the drum may be operated in a float position so that the drum moves up and down in response to changes in the swath or the terrain being traveled.

When operated in the float position the drum exerts a downward anchoring force on the swath that is equal to the weight of the drum and any mounting brackets etc. which move up and down with the drum.

SUMMARY OF THE INVENTION

The present disclosure provides a swath roller apparatus that overcomes problems in the prior art.

In a first embodiment the present disclosure provides a swath roller apparatus for a swather, the swather operative to cut standing crop plants and lay cut plants in a swath as the swather moves along the ground in an operating travel direction. The apparatus comprises a drum rotatably attached to an axle. The axle is adapted to be movably attached to a rear portion of the swather such that the axle is oriented substantially horizontally and perpendicular to the operating travel direction, and such that the drum moves up and down and rolls along a top of the swath exerting a downward anchoring force on the swath. A bias element is operative to exert a bias force on the axle, and a bias force control is operative to vary the bias force to vary the anchoring force.

In a second embodiment the present disclosure provides a method of swathing a crop comprising moving a swather along the ground in an operating travel direction such that the swather cuts standing crop plants and lays the cut plants in a swath behind the swather supported on standing stubble of the cut crop plants; rotatably attaching a drum to a rear portion of the swather such that a rotational axis of the drum is oriented substantially horizontally and perpendicular to the operating travel direction; allowing the drum to move up and down and roll along a top of the swath such that the drum exerts a downward anchoring force on the swath and pushes the swath into the standing stubble; exerting a bias force on the drum and manipulating a bias force control to vary the bias force to vary the anchoring force in response to variations in the crop as the swather moves along the ground.

In the prior art, where the height of the drum is fixed, the drum is simply held at a location that is fixed with respect to the ground. Thus in a heavy crop where the swath is large and the standing stubble is high the swath is pushed far down into the stubble. In a lighter crop however, the swath can be much smaller and the standing stubble also much lower, so the swath may be pushed only slightly into the stubble or not at all, leaving the swath subject to movement from wind.

In prior art swath rollers where the drum floats up and down as it rolls along the top of the swath the anchoring force is the same regardless of the crop being cut. In a lighter crop, the swath may be pushed so far down into the standing stubble that the swath is difficult to pull up out of the stubble when the swath is harvested. Increased contact with the pick-up teeth of the harvester attempting to pick the swath out of the stubble can cause shelling of fragile crops and subsequent loss of seeds and lost revenue. Harvesting speed is reduced as well. Similarly in a heavier crop the anchoring force may be insufficient to push the swath sufficiently down into the stubble to anchor same and resist movement by the wind, again resulting in lost crop plants and revenue.

In contrast, the swath roller apparatus of the present disclosure instead exerts a downward anchoring force pushing the swath down into the standing stubble that can be varied by the operator to suit crop conditions as they may vary throughout a field, or from one field to another.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
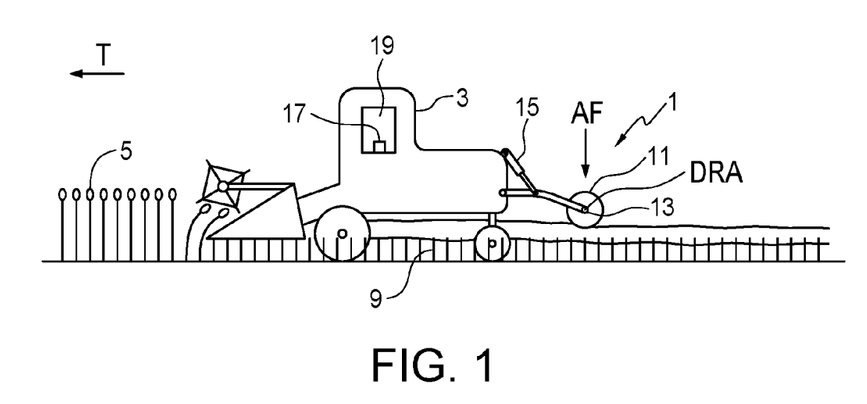
FIG. 1 is a schematic side view of a swather cutting standing crop plants and laying same in a swath, and with an embodiment of a swath roller apparatus of the present disclosure mounted on a rear portion thereof.
Figure 2:
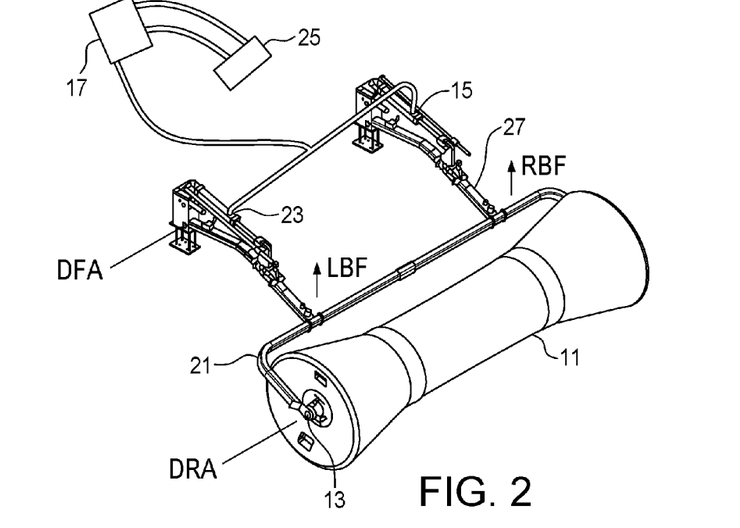
FIG. 2 is a rear perspective view of the embodiment of the swath roller apparatus of FIG. 1.
Figure 3:
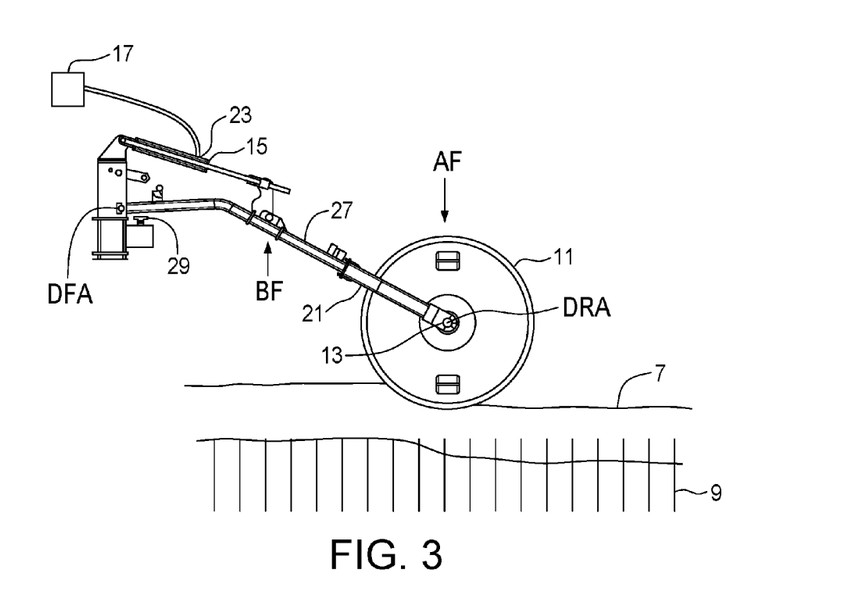
FIG. 3 is a side view of the embodiment of the swath roller apparatus of FIG. 1.

FIGS. 1-3 schematically illustrate an embodiment of a swath roller apparatus 1 of the present disclosure for use with a swather 3. The swather 3 is operative to cut standing crop plants 5 and lay cut plants in a swath 7 supported on standing stubble 9 of the cut crop plants as the swather moves along the ground in an operating travel direction T.

The apparatus 1 comprises a drum 11 rotatably attached to an axle 13. The axle 13 is adapted to be movably attached to a rear portion of the swather 3 such that the axle 13 is oriented substantially horizontally and perpendicular to the operating travel direction T, and such that the drum 11 moves up and down and rolls along a top of the swath 7 exerting a downward anchoring force AF on the swath 7 such as is known in the prior art where the drum 11 is allowed to float. The anchoring force AF is equal to the weight of the drum 11, axle 13, and any mounting framework for same. The rolling drum 11 pushes the swath 7 down into the standing stubble 9, as schematically illustrated in FIGS. 1 and 3 where same is anchored and resists movement by the wind.

In prior art swath rollers where the drum is fixed rather than floating, the drum is simply held at a location that is fixed with respect to the ground, and in a heavy crop, where the swath 7 is large and the standing stubble 9 is high, the swath is pushed far down into the stubble 9, however where the crop is lighter the swath 7 is smaller and the standing stubble is lower, so the swath may be pushed only slightly into the stubble 9, or not at all, leaving the swath 7 unanchored and subject to movement from wind.

In the prior art swath rollers where the drum is allowed to float, rolling along on the top of the swath, the anchoring force is the same regardless of the crop being cut. In a lighter crop, the swath 7 may be pushed so far down into the standing stubble 9 that the swath is difficult to pull up out of the stubble when the swath is harvested. Increased contact with the pick-up teeth of the harvester attempting to pick the swath 7 out of the stubble 9 can cause shelling of fragile crops and subsequent loss of seeds and lost revenue. Harvesting speed is reduced as well. Similarly in a heavier crop the anchoring force may be insufficient to push the swath 7 sufficiently down into the stubble 9 to anchor same and resist movement by the wind, again resulting in lost crop plants and revenue.

The swath roller apparatus 1 exerts a downward anchoring force AF that can be varied to suit crop conditions. Right and left bias elements, illustrated as hydraulic cylinders 15, are operative to exert substantially equal right and left bias forces RBF, LBF on corresponding right and left ends of the axle 13, the sum of the right and left bias forces RBF, LBF equaling a total bias force BF on the drum 11. In other configurations, a single bias element could provide the bias force BF. A bias force control, provided by a hydraulic control valve 17, is operative to vary the bias force BF. The bias force control 17 is adapted to be mounted at an operator's station 19 of the swather 3, where same can be manipulated by the operator during operation.

In the apparatus 1, the bias force BF is exerted in an upward direction on the axle 13 to reduce the anchoring force. The maximum anchoring force AF will be equal to the weight of the drum 11, axle 13, and drum frame 21. This weight can be increased with ballast to achieve the maximum anchoring force that is contemplated to be required, and the bias force BF can be increased as desired by the operator to reduce the anchoring force AF to some force less than the maximum anchoring force.

As schematically illustrated in FIG. 2, the hydraulic cylinders 15 have first ports 23 thereof connected through a hydraulic control valve 17, to a pressurized hydraulic fluid source 25 of the swather 3. The hydraulic fluid source 25 is configured, as is known in the art, such that a substantially constant bias pressure is maintained in the hydraulic cylinders 15 to exert a substantially constant bias force BF, and such that hydraulic fluid moves into and out of the hydraulic cylinders 15 through the first ports 23 in response to forces exerted on the hydraulic cylinders 15 that are greater or less than the bias force BF. The hydraulic control valve 17 is operative to vary the bias pressure in the hydraulic cylinders 15 to increase or decrease the bias force BF, and thereby correspondingly decrease or increase the anchoring force AF as the operator decides is required.

The hydraulic valve 17 is further operative to direct pressurized hydraulic fluid through the first ports 23 of the hydraulic cylinders 15 at a sufficiently increased bias pressure to raise the drum 11 above the swath 7.

In the illustrated apparatus 1, the drum 11 is rotatably mounted in a drum frame 21 that is adapted to be pivotally attached to the rear portion of the swather 3 about a drum frame axis DFA oriented substantially parallel to the rotational axis DRA on the axle 13 of the drum 11. The bias elements, hydraulic cylinders 15, are operative to exert the upward bias force BF on forward extending members 27 of the drum frame 21. To prevent damage to the drum 11, an adjustable stop 29 limits downward movement of the drum 11 to a lowest location where the drum 11 is above the ground.

Figure 4:
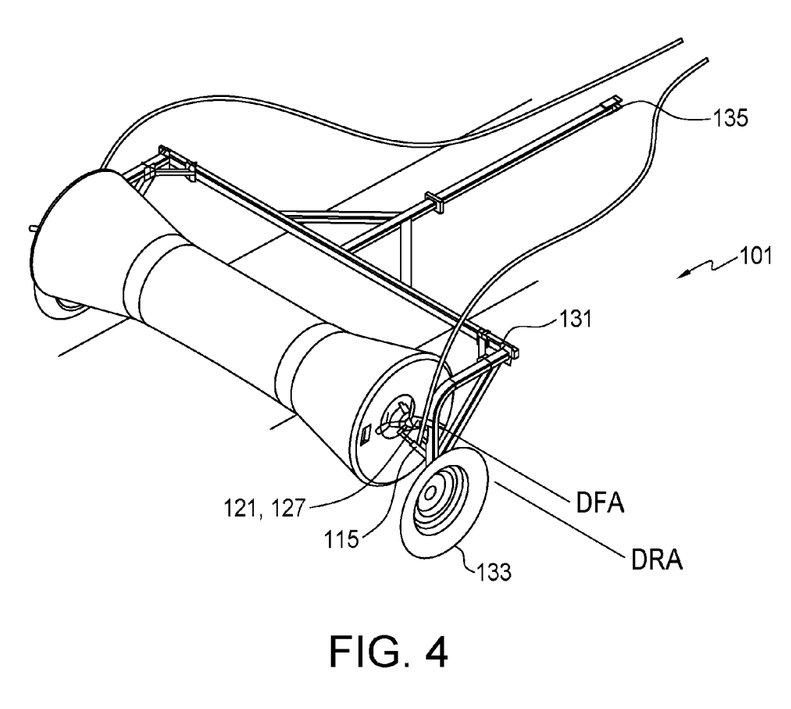
FIG. 4 is a rear perspective view of an alternate embodiment of a swath roller apparatus of the present disclosure where the drum is mounted on a trailer.

In the apparatus 1 the drum frame 21 is adapted to be pivotally attached directly to the rear portion of the swather 3 about the drum frame axis DFA. FIG. 4 schematically illustrates an alternate swath roller apparatus 101 wherein the drum frame 121 comprises arms 127 pivotally attached about the drum frame axis DFA to a trailer frame 131 mounted on wheels 133, and then the hitch tongue 135 of the trailer frame 131 is adapted to be attached to the rear portion of the swather 3. Hydraulic cylinders 115 exert the upward bias force BF on the arms 127.

Figure 5:
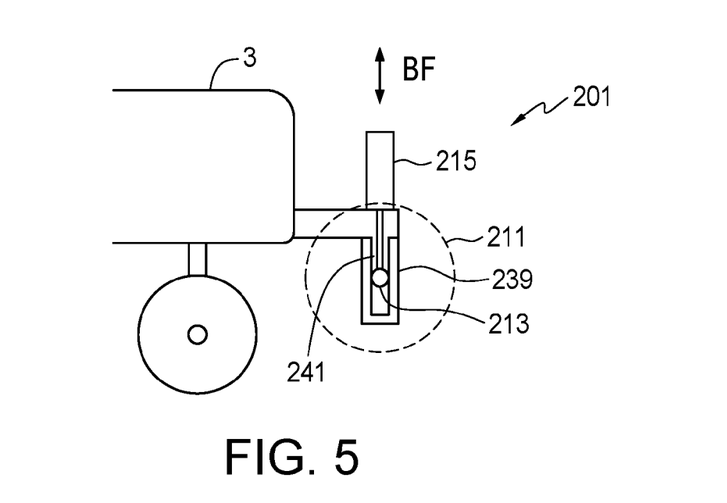
FIG. 5 is a schematic cut-away side view of an alternate embodiment of a swath roller apparatus of the present disclosure.
Figure 6:
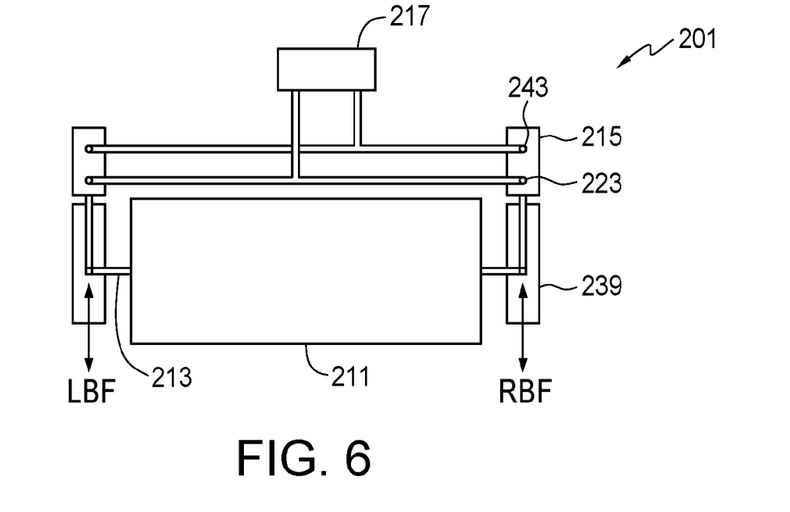
FIG. 6 is a schematic cut-away rear view of the embodiment of the swath roller apparatus of FIG. 5

FIGS. 5 and 6 schematically illustrate a further alternate swath roller apparatus 201 where the drum 211 is rotatably mounted to an axle 213. Right and left guide plates 239 each define a guide channel 241, and are adapted to be attached to the rear portion of the swather 3 such that the guide plates 239 extend downward from the swather 3 Right and left ends of the axle 213 engage corresponding guide channels 241 in the right and left guide plates 239. Right and left bias elements, hydraulic cylinders 215, are operative to exert substantially equal right and left bias forces RBF, LBF on corresponding right and left ends of the axle 213.

In the apparatus 201, the hydraulic cylinders 215 are double acting cylinders, and the hydraulic control valve 217 is operative to direct pressurized hydraulic fluid into either the first ports 223 to exert the bias force BF upward, or into the second ports 243 to exert the bias force BF downward. Where it is contemplated that an increased anchoring force AF may be desired that is greater than the weight of the drum, axle, and their mounting parts, the bias force BF can be exerted downward to increase the anchoring force AF.

Figure 7:
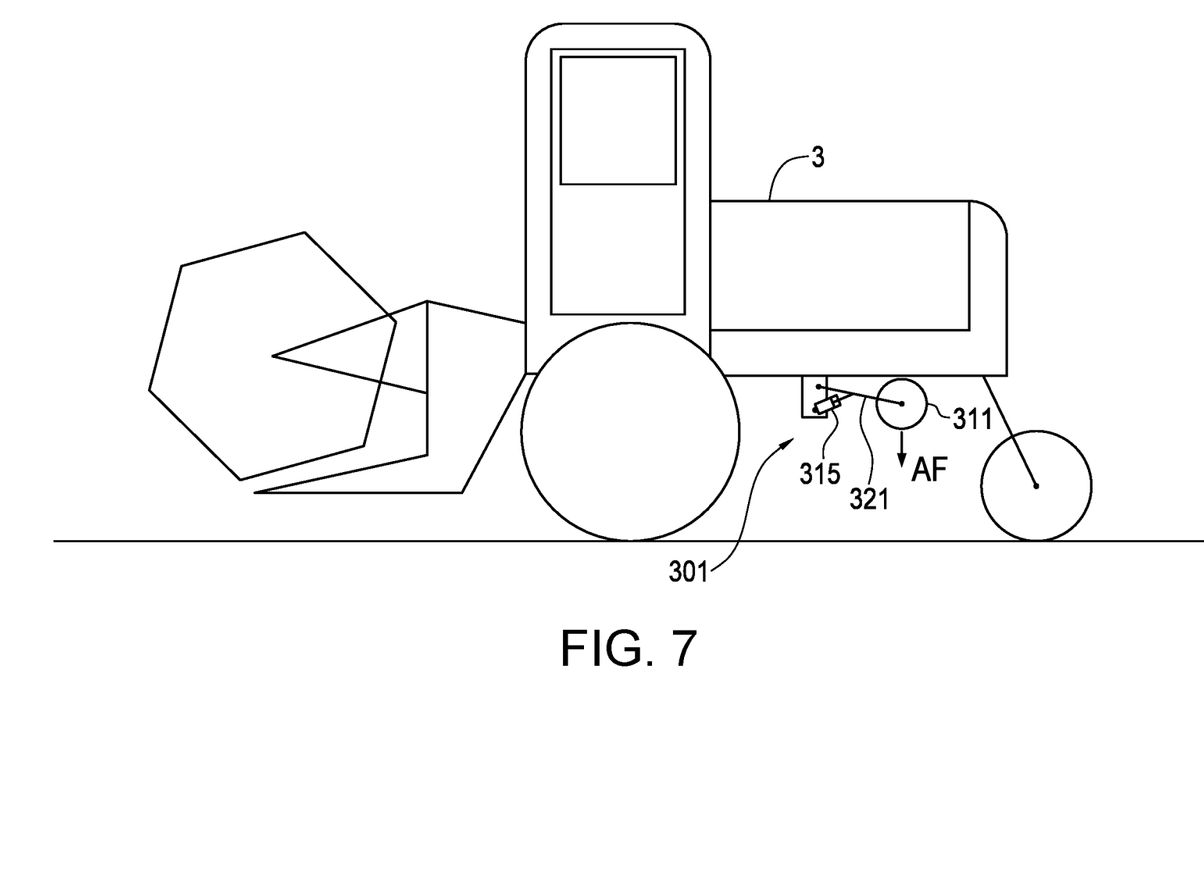
FIG. 7 is a schematic side view of an alternate embodiment of a swath roller apparatus of the present disclosure mounted directly under a swather.

FIG. 7 schematically illustrates a further alternate swath roller apparatus 301 where the drum 311 is mounted on a drum frame 321 directly under a rear portion of the swather 3. Bias elements in the form of hydraulic cylinders 315 provide the desired upward or downward bias forces to provide the desired anchoring force AF.

The present disclosure also provides a method of swathing a crop comprising moving a swather 3 along the ground in an operating travel direction T such that the swather cuts standing crop plants 5 and lays the cut plants in a swath 7 behind the swather 3 supported on standing stubble 9 of the cut crop plants, rotatably attaching a drum 11 to a rear portion of the swather 3 such that a rotational axis DRA of the drum 11 is oriented substantially horizontally and perpendicular to the operating travel direction T, allowing the drum 11 to move up and down and roll along a top of the swath 7 such that the drum 11 exerts a downward anchoring force AF on the swath 7 and pushes the swath 7 into the standing stubble 9. In the prior art, the drum 11 is simply held at a location that is substantially fixed with respect to the ground, and in a heavy crop, where the swath 7 is large and the standing stubble 9 is high, the swath is pushed far down into the stubble 9, however where the crop is lighter the swath 7 is smaller and the standing stubble is lower, so the swath may be pushed only slightly into the stubble 9, or not at all, leaving the swath 7 unanchored and subject to movement from wind. The swath roller apparatus 1 of the present disclosure instead exerts a downward anchoring force AF that can be selected by the operator in response to varying crop conditions to push the swath 7 down into the standing stubble 9 to a desired degree.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of swathing a crop comprising:
    moving a swather along the ground in an operating travel direction such that the swather cuts standing crop plants and lays the cut plants in a swath behind the swather supported on standing stubble of the cut crop plants;
    rotatably attaching a drum to a rear portion of the swather such that a rotational axis of the drum is oriented substantially horizontally and perpendicular to the operating travel direction;
    allowing the drum to move up and down and roll along a top of the swath such that the drum exerts a downward anchoring force on the swath and pushes the swath into the standing stubble;
    exerting a bias force on the drum and manipulating a bias force control to vary the bias force in an upward or downward direction to vary the anchoring force in response to variations in the crop as the swather moves along the ground from an anchoring force greater than a weight of the drum to an anchoring force less than a weight of the drum.

2. The method of claim 1 wherein the bias element is provided by connecting a first port of a hydraulic cylinder to a pressurized hydraulic fluid source of the swather such that the bias force is directed in one of an upward and downward direction, and manipulating the bias force control to vary a bias pressure in the hydraulic cylinder to vary the bias force, and allowing hydraulic fluid to move into and out of the hydraulic cylinder through the first port in response to forces exerted on the hydraulic cylinder that are greater or less than the bias force.

3. The method of claim 2 comprising directing pressurized hydraulic fluid through a second port of the hydraulic cylinder such that the bias force is directed in the other of the upward and downward directions.

4. The method of claim 3 comprising directing pressurized hydraulic fluid through one of the first and second ports at an increased bias pressure to raise the drum above the swath.

5. The method of claim 1 further comprising limiting downward movement of the drum to a lowest location where the drum is above the ground.

* * * * *